(12) United States Patent
Kumar et al.

(10) Patent No.: US 10,445,691 B2
(45) Date of Patent: Oct. 15, 2019

(54) SYSTEM FOR IMPROVING ORDER BATCHING USING LOCATION INFORMATION OF ITEMS IN RETAIL STORE AND METHOD OF USING SAME

(71) Applicant: Wal-Mart Stores, Inc., Bentonville, AR (US)

(72) Inventors: Ashwin Kumar, Bangalore (IN); Ameya Ajay Shendre, Bangalore (IN); Pratosh Deepak Rajkhowa, Bangalore (IN); R R Pavan Kumar, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 262 days.

(21) Appl. No.: 15/418,101

(22) Filed: Jan. 27, 2017

(65) Prior Publication Data
US 2018/0218311 A1    Aug. 2, 2018

(51) Int. Cl.
*G06Q 10/08*     (2012.01)
*G01C 21/20*    (2006.01)

(52) U.S. Cl.
CPC ......... *G06Q 10/087* (2013.01); *G01C 21/206* (2013.01)

(58) Field of Classification Search
CPC combination set(s) only.
See application file for complete search history.

(56) References Cited

U.S. PATENT DOCUMENTS

| | | | |
|---|---|---|---|
| 8,201,737 B1 * | 6/2012 | Palacios Durazo .. | G06Q 10/087 235/383 |
| 9,147,208 B1 * | 9/2015 | Argue ................... | G06Q 30/06 |
| 9,466,045 B1 * | 10/2016 | Kumar ................. | G06Q 10/087 |
| 9,626,709 B2 * | 4/2017 | Koch ...................... | G06F 16/00 |
| 10,127,514 B2 * | 11/2018 | Napoli ................. | G06Q 10/083 |
| 2005/0278062 A1 * | 12/2005 | Janert .................... | G06Q 10/08 700/214 |
| 2007/0244758 A1 * | 10/2007 | Xie ........................ | G06Q 30/02 705/14.51 |
| 2009/0157472 A1 * | 6/2009 | Burazin ................. | G06Q 30/02 705/14.57 |
| 2010/0010902 A1 * | 1/2010 | Casey .................... | G06Q 10/08 705/17 |

(Continued)

FOREIGN PATENT DOCUMENTS

DE    102012100354 A1 *  7/2013  .......... G01C 21/206

*Primary Examiner* — Ashford S Hayles
(74) *Attorney, Agent, or Firm* — Bryan Cave Leighton Paisner LLP (57) ABSTRACT

A system and method includes receiving a plurality of orders having one or more items, separating the orders by load number and due times, batching the separate orders into different commodities, generating an optimized pick path through a retail store to pick the one or more items according to an optimization algorithm that generates the optimized pick path based on item location of the one or more items within the batched orders of the different commodities, obtaining a store map, the store map being indicative of a layout of the retail store, transmitting a representation of the store map and the optimized pick path to the user device, and displaying the store map overlaid with the optimized pick path on a graphical display of the user device.

20 Claims, 7 Drawing Sheets

(56) References Cited

U.S. PATENT DOCUMENTS

| | | | |
|---|---|---|---|
| 2012/0150340 A1* | 6/2012 | Suess | B65G 1/137 700/216 |
| 2012/0330458 A1* | 12/2012 | Weiss | B66F 9/063 700/216 |
| 2013/0346204 A1* | 12/2013 | Wissner-Gross | G06Q 30/0281 705/14.58 |
| 2014/0003727 A1* | 1/2014 | Lortz | G06Q 10/087 382/218 |
| 2014/0156553 A1* | 6/2014 | Leach | G06Q 10/08355 705/338 |
| 2014/0207615 A1 | 7/2014 | Li et al. | |
| 2014/0266616 A1 | 9/2014 | Jones et al. | |
| 2014/0279294 A1* | 9/2014 | Field-Darragh | G06Q 10/087 705/28 |
| 2014/0324491 A1* | 10/2014 | Banks | G06Q 10/087 705/7.12 |
| 2014/0336814 A1* | 11/2014 | Moore | G06Q 10/087 700/216 |
| 2014/0351101 A1* | 11/2014 | Danelski | G06Q 10/087 705/28 |
| 2015/0051994 A1* | 2/2015 | Ward | G06Q 30/0639 705/23 |
| 2015/0170256 A1* | 6/2015 | Pettyjohn | G06Q 30/0639 705/14.49 |
| 2015/0310447 A1* | 10/2015 | Shaw | G06Q 30/016 705/304 |
| 2016/0092969 A1 | 3/2016 | Gopalsamy et al. | |
| 2016/0223339 A1* | 8/2016 | Pellow | G01C 21/206 |
| 2016/0253740 A1* | 9/2016 | Goulart | G06Q 30/0635 705/26.8 |
| 2016/0258762 A1 | 9/2016 | Taylor et al. | |
| 2016/0299782 A1* | 10/2016 | Jones | G06Q 10/06316 |
| 2017/0200108 A1* | 7/2017 | Au | G06Q 10/06398 |
| 2017/0213186 A1* | 7/2017 | Grifoni | G06Q 10/0833 |
| 2017/0228701 A1* | 8/2017 | Wosk | G01C 21/3484 |
| 2017/0278047 A1* | 9/2017 | Welty | B65G 1/0492 |
| 2017/0285648 A1* | 10/2017 | Welty | G05D 1/0246 |
| 2018/0137452 A1* | 5/2018 | Khatravath | G06Q 10/063114 |
| 2018/0182054 A1* | 6/2018 | Yao | G06Q 50/28 |
| 2018/0314991 A1* | 11/2018 | Grundberg | G06Q 10/04 |
| 2018/0342031 A1* | 11/2018 | Tada | B65G 1/137 |

* cited by examiner

SYSTEM FOR IMPROVING ORDER BATCHING USING LOCATION INFORMATION OF ITEMS IN RETAIL STORE AND METHOD OF USING SAME

BACKGROUND OF THE INVENTION

1. Field of the Invention

The present invention relates generally to in-store fulfillment for retail stores and, more particularly, to a system for improving order batching using location information of items in a retail store and method of using same.

2. Description of the Related Art

In general, order fulfillment may refer to a complete process from point-of-sales inquiry to delivery of an item or product to a customer. In the context of a physical store, in-store fulfillment may refer to a process from receiving a customer notification, e.g., ordering an item or product via the Internet, for store pick up or delivery to the customer. This process may require a number of tasks including, for example, locating the item in the store's inventory, moving the item to a point of sales of the retail store, and staffing to ensure there is manpower to consummate the sale when the customer arrives at the retail store.

Current in-store picking involves global integrated fulfillment (GIF) systems that batch orders based on their priority (due time and order placement time) with static constraints such as a maximum number of orders in one pick-walk by staff of the retail store. These batch orders are limited by time of day and are known in advance. The batch orders are separated by load number (e.g., truck) and due times (e.g., 9:00 a.m.) and the separate orders are batched into different commodities or items (e.g., frozen). A staff or "picker" receives a number of batch orders and then walks through the retail store to retrieve the items and fill a tote with the items from the batch orders on a first-come-first basis.

Traditionally, store systems use sequence numbers of items to identify the pick sequence for a given set of orders. However this may involve inefficient use of the picker in walking the retail store to retrieve the items.

It is, therefore, desirable to provide a new system and method that improves order batching using location information of items in a retail store. It is also desirable to provide a new system and method that uses exact item location using (X, Y) co-ordinates for improving batching of orders to generate optimal pick paths within the retail store. It is further desirable to provide a new system and method that uses XY data to provide an optimal pick path for picking the items/products within the retail store. Thus, there is a need in the art to provide a system for improving order batching using location information of items in a retail store and method of using same that meets at least one of these desires.

SUMMARY OF THE INVENTION

Accordingly, the present invention provides a system including a computing device configured to provide output to a user device. The computer system is configured to receive a plurality of orders having one or more items, to separate the orders by load number and due times, and to batch the separate orders into different commodities. The computer system is also configured to generate an optimized pick path through a retail store to pick the one or more items according to an optimization algorithm that generates the optimized pick path based on item location of the one or more items within the batched orders of the different commodities. The computer system is further configured to obtain a store map, the store map being indicative of a layout of the retail store, and to transmit a representation of the store map and the optimized pick path to the user device, and to display the store map overlaid with the optimized pick path on a graphical display of the user device.

In addition, the present invention provides a method including the steps of receiving, by a computing device, a plurality of orders having one or more items, separating, by the computing device, the orders by load number and due times, and batching, by the computing device, the separate orders into different commodities. The method also includes the steps of generating, by the computing device, an optimized pick path through a retail store to pick the one or more items according to an optimization algorithm that generates the optimized pick path based on item location of the one or more items within the batched orders of the different commodities. The method further includes the steps of obtaining, by the computing device, a store map, the store map being indicative of a layout of the retail store, transmitting, by the computing device, a representation of the store map and the optimized pick path to the user device, and displaying the store map overlaid with the optimized pick path on a graphical display of the user device.

Further, the present invention provides one or more non-transitory computer-readable storage media, having computer-executable instructions embodied thereon, wherein when executed by at least one processor cause the processor to receive a plurality of orders having one or more items, to separate the orders by load number and due times, and to batch the separate orders into different commodities. The computer-executable instructions also cause the processor to generate an optimized pick path through a retail store to pick the one or more items according to an optimization algorithm that generates the optimized pick path based on item location of the one or more items within the batched orders of the different commodities. The computer-executable instructions further cause the processor to obtain a store map, the store map being indicative of a layout of the retail store, and to transmit a representation of the store map and the optimized pick path to the user device, and to display the store map overlaid with the optimized pick path on a graphical display of the user device.

One advantage of the present invention is that a new system and method is provided for improving order batching using location information of items in a retail store of a large retailer. Another advantage of the present invention is that the system and method provides a way to use exact item information using (X,Y) coordinates, henceforth called XY location, for improving batching of orders to generate optimal pick paths within a retail store. Yet another advantage of the present invention is that the system and method uses actual XY information of items locations (in-place of sequence numbers) for generating accurate pick-paths within the retail store. Still another advantage of the present invention is that the system and method provides more accurate savings calculation as accurate item positions are available. A further advantage of the present invention is that the system and method uses XY data to provide an optimal picking path for items within the retail store.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

With reference to the FIGS. and in operation, the present invention provides a system 100, methods and computer product media that facilitate order batching using location information of items in a retail store of the retailer. In particular, the present invention uses exact item information using (X,Y) coordinates, henceforth called XY location, for improving batching of orders to generate optimal pick paths within a retail store.

For clarity in discussing the various functions of the system 100, multiple computers and/or servers are discussed as performing different functions. These different computers (or servers) may, however, be implemented in multiple different ways such as modules within a single computer, as nodes of a computer system, etc. . . . The functions as performed by the system 100 (or nodes or modules) may be centralized or distributed in any suitable manner across the system 100 and its components, regardless of the location of specific hardware. Furthermore, specific components of the system 100 may be referenced using functional terminology in their names. The function terminology is used solely for purposes of naming convention and to distinguish one element from another in the following discussion. Unless otherwise specified, the name of an element conveys no specific functionality to the element or component.

Figure 1:
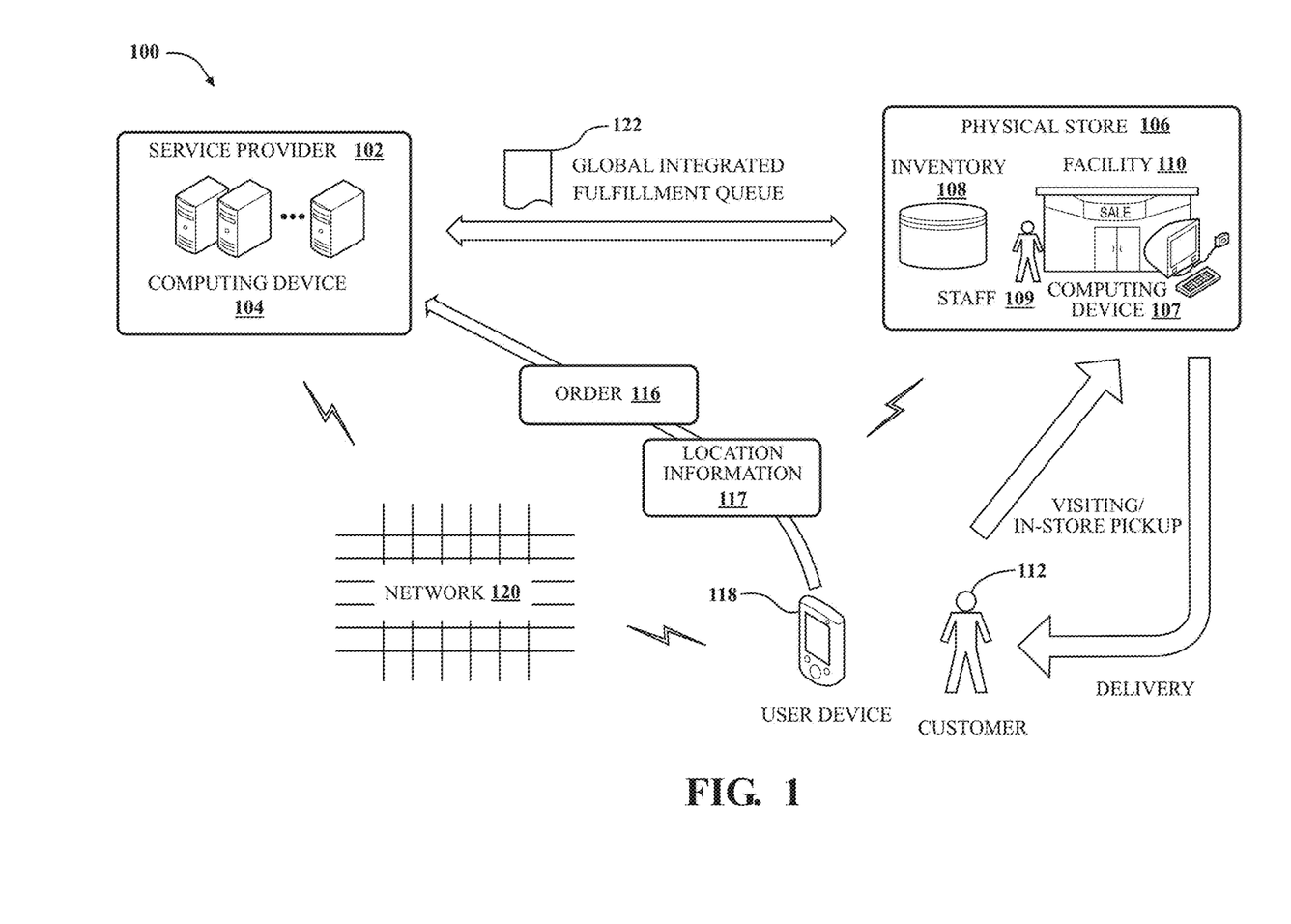
FIG. 1 is a diagrammatic view of a system for improving order batching using location information of items in a retail store, according to one embodiment of the present invention, illustrated in relationship with a retail store.

Referring to FIG. 1, an exemplary environment in which the system 100 for order batching using location information of items in a retail store of the retailer. In particular, the present invention uses exact item information using (X,Y) location for improving batching of orders to generate optimal pick paths within a physical retail store 106, according to one embodiment of the present invention, is illustrated. The system 100 may be configured for a large retailer having one or more retail stores 106 each having one or more items or products in the retail stores 106. The term "retail store" can include brick-and-mortar stores operated by a single retailer, e.g., supermarket or superstore, or a location that includes stores operated by multiple retailers, e.g., a shopping mall or a shopping plaza.

. The system 100 includes a computing device 104, e.g., server, associated with a service provider 102. The service provider 102 may provide a service related to order fulfillment for one or more customers, such as in-store fulfillment for the retail store 106. For example, the service may include a set of related software and/or hardware functionalities that, together with certain policies set by the service provider 102, enable the retail store 106 to manage an inventory 108 and staff 109 associated with a facility 110 of the retail store 106 in filling fulfillment demands.

In some embodiments, the computing device 104 may receive an order 116 from a first user or customer, such as a user device 118 used by a user or customer 112, for in-store pickup of the first item by the customer 112 at the store, such as the retail store 106, or for delivery of the first item to the customer 112. For example, the customer 112 may install and execute a software application on the user device 118, which may be a smartphone for example, and place the order 116 via such software application. The software application may be provided by the service provider 102. The first item may include one or more items or products and/or one or more services. The order 116 may or may not indicate a planned arrival time of customer 112.

The computing device 104 may also receive location information 117 from the user device 118 of the customer 112. The location information 117 may indicate geographic location of the user device 118 in the form of, for example, global positioning system (GPS) coordinates or a street address. Based on the location information 117, the computing device 104 may determine a location of the customer 112. The computing device 104 may also receive one or more other orders from one or more other customers (not shown) for delivery or in-store pickup at the retail store 106. In other words, there may be plural orders received by the computing device 104 for delivery or in-store pickup at the retail store 106, including the order 116 from the customer 112 and at least one other order from another customer.

In some embodiments, the computing device 104 may receive data and/or information related to the customer 112 from the user device 118 via a network 120. The network 120 enables the computing device 104 to exchange information with the user device 118. The network 120 may include wired and/or wireless networks that enable communications between the various computing devices described in the system 100. In some embodiments, the network 120 may include local area networks (LANs), wide area networks (WAN), mobile telephone networks (MTNs), and other types of networks, possibly used in conjunction with one another, to facilitate communication between the various computing devices (e.g., computing device 104 and user device 118). The user computing device or user device 107, 118 may be a mobile or desktop computer, a personal data assistant (PDA), an internet appliance, an internet enabled mobile phone, a server or any other computing device configured with a network connection.

In some embodiments, the computing device 104 may receive an update of the location of the customer 112 and estimate a revised arrival time of the customer 112 based at least in part on the update of the location of the customer 112. For example, the computing device 104 may continuously or periodically track the location of the customer 112 on his way to the retail store 106 by receiving continuous or periodic location information 117 from the user device 118. The computing device 104 may then re-prioritize the fulfillment of the plural orders for in-store pickup based at least in part on the revised arrival time of the customer 112. It should be appreciated that methods and systems for in-store fulfillment prioritization based on customer location is disclosed in U.S. Patent Application Publication No. 2016/0092969, the entire disclosure of which is expressly incorporated by reference.

In some embodiments, in the fulfillment of the plural orders for in-store pickup or delivery, the computing device 104 may determine a fulfillment queue 122 based at least in part on the number of orders and the due time and order place time. The computing device 104 may transmit the fulfillment queue 122 to a user computing device 107 associated with the retail store 106. It should be appreciated that the fulfillment queue 122 receives batch orders that limited by time of day and are known in advance.

Figure 2:
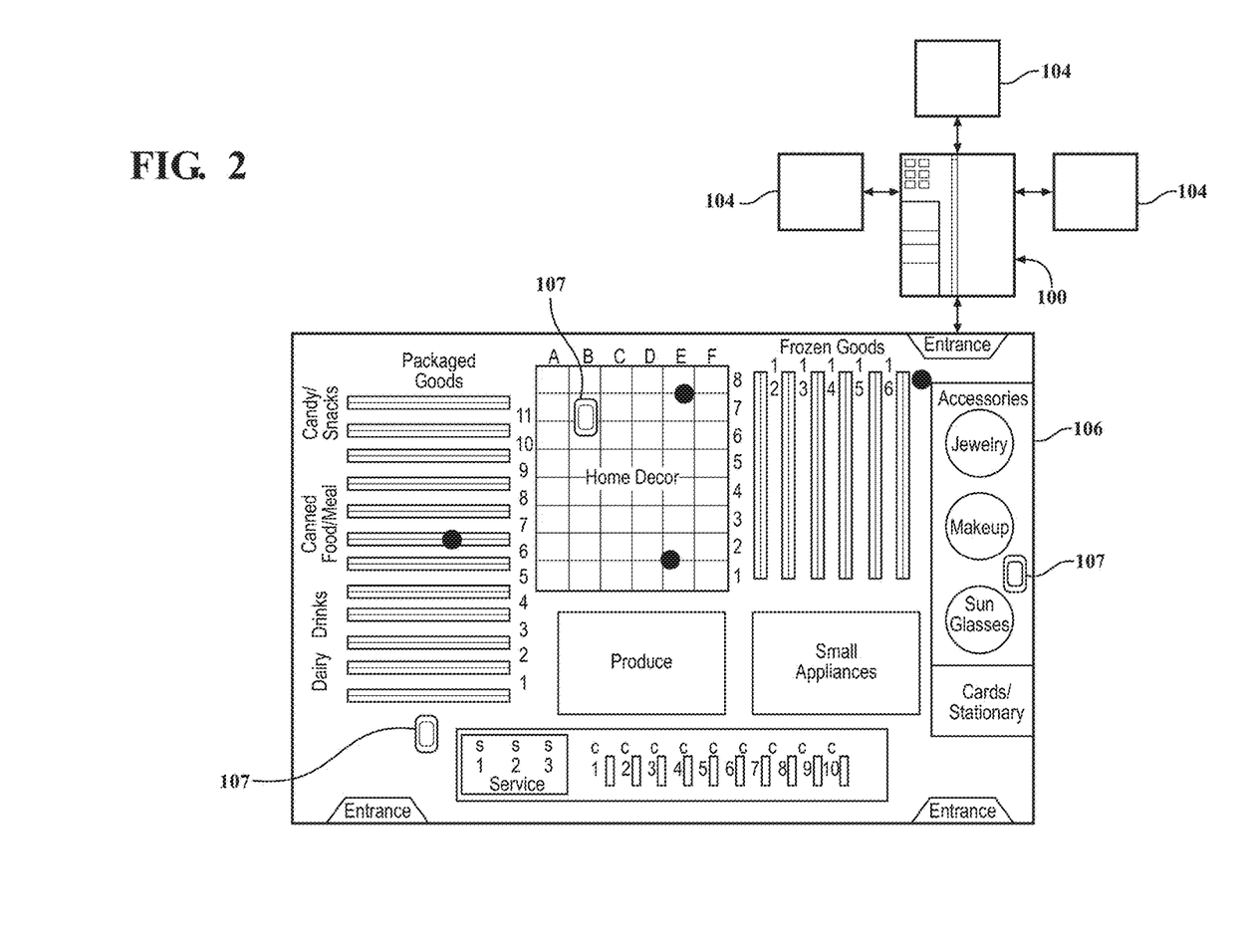
FIG. 2 is another diagrammatic view of the system of FIG. 1.

An exemplary retail store 106 is illustrated in FIG. 2 and can be arranged into different departments, such as packaged goods including dairy, drinks, canned foods/meals, and candy/snacksproduce; home decor; produce; frozen goods; small appliances; and accessories including jewelry, make-up, sunglasses, and cards/stationary. Each department can be further delineated. For example, the exemplary packaged goods area of the retail store 106 can be subdivided into aisles 1-11 and each aisle can define an "a" side and a "b" side opposite the "a" side. In one embodiment, for each aisle (cluster of modules), there may be bay types and aisle types. The exemplary home decor area can be divided into a grid by letters A-F along a first edge and numbers 1-8 along a second edge perpendicular to the first edge. The illustrated, exemplary retail store 106 can also include one or more entrances, a service counter, and several checkout lines each referenced in FIG. 2 by the letter "c" and a number. It should be appreciated that the arrangement of the retail store 106 is exemplary. It should also be appreciated that, in some embodiments of the present invention, the retail store 106 can be arranged differently and include different departments and/or different products and/or methods for labeling aisles.

The computing device 104 may also store location information corresponding to departments, product categories, product types, etc. The in-store location information may include one or more of, a 3-dimensional coordinate, a 2-dimensional coordinate, department identifier, section identifier, an aisle number, a row number, a display fixture identifier, a display container identifier, shelf height, and the like. In some embodiments, the location information is determined based a planogram of the shopping facility space. In one embodiment, the location information is based on (X, Y) coordinates, henceforth called XY location. In one embodiment, each item has an XY coordinate for its location within the retail store 106. It should be appreciated that the location information is stored in a database to be described.

Figure 3:
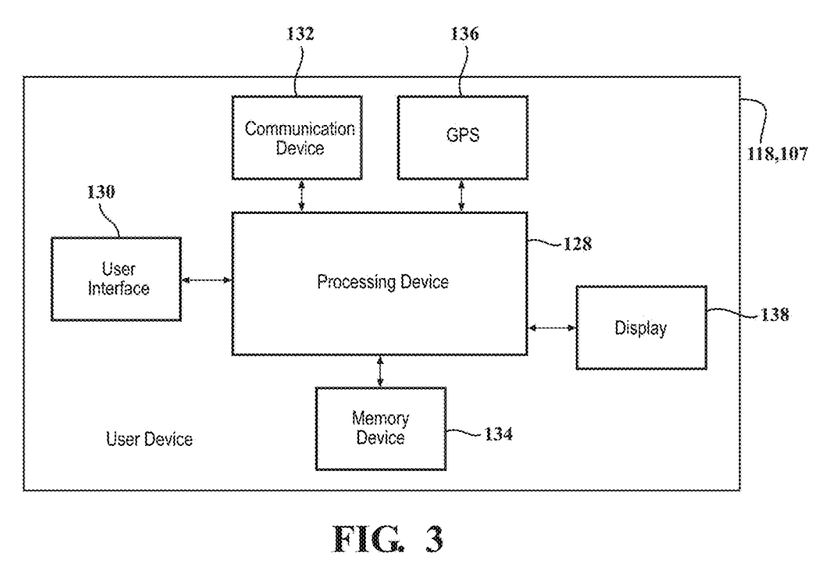
FIG. 3 is a diagrammatic view of a user device used with the system of FIG. 1.

Referring now to FIG. 3, a schematic illustrating example components of one user computing device 107 or user device 118 of FIG. 1 is illustrated. In the illustrative embodiment, the user computing device 107, 118 includes a processing device 128, a user interface 130, a communication device 132, a memory device 134, a global positioning system (GPS) 136, and a display 138. It should be appreciated that the user computing device 107, 118 can include other components and some of the components are not required.

The processing device 128 can include memory, e.g., read only memory (ROM) and random access memory (RAM), storing processor-executable instructions and one or more processors that execute the processor-executable instructions. In embodiments where the processing device 128 includes two or more processors, the processors can operate in a parallel or distributed manner. The processing device 128 can execute the operating system of the user computing device 107, 118.

The user interface 130 is a device that allows a user to interact with the user computing device 107, 118. While one user interface 130 is shown, the term "user interface" can include, but is not limited to, a touch screen, a physical keyboard, a mouse, a microphone, and/or a speaker. The communication device 132 is a device that allows the user computing device 107, 118 to communicate with another device, e.g., the server computing device 104 via the network 120. The communication device 132 can include one or more wireless transceivers for performing wireless communication and/or one or more communication ports for performing wired communication. The memory device 134 is a device that stores data generated or received by the user computing device 107, 118. The memory device 134 can include, but is not limited to, a hard disc drive, an optical disc drive, and/or a flash memory drive.

The GPS 136 is a device that determines a location of the user computing device 107, 118 by communicating with a plurality of GPS satellites. The GPS 136 can perform known triangulation techniques to determine the GPS coordinates of the user computing device 107, 118. It should be appreciated that while a GPS 136 is shown, any other suitable component for determining the location of the user computing device 107, 118 can be implemented.

The display 138 of the user computing device 107, 118 may be a graphical user interface (GUI) that displays information to be described. The GUI further includes a plurality of input objects which allow the user to provide commands to the user computing device 107, 118. In some embodiments, the system 100 may return an item or product waypoint corresponding to an item or product in the retail store 106, each item waypoint indicating a physical location of a specific item in the retail store 106. The display 138 can display the item waypoints to the user via the GUI. In some embodiments, the item waypoints can be displayed in a store map of the retail store 106. In some embodiments, the server computing device 104 can return a map of the retail store 106 and waypoints corresponding to the items or products and map to the user computing device 107. The user computing device 107 can display the store map, such that the waypoints are displayed in the map. It should be appreciated that, in some embodiments, the user interface 130 and the display 138 may be one in the same.

Figure 4:
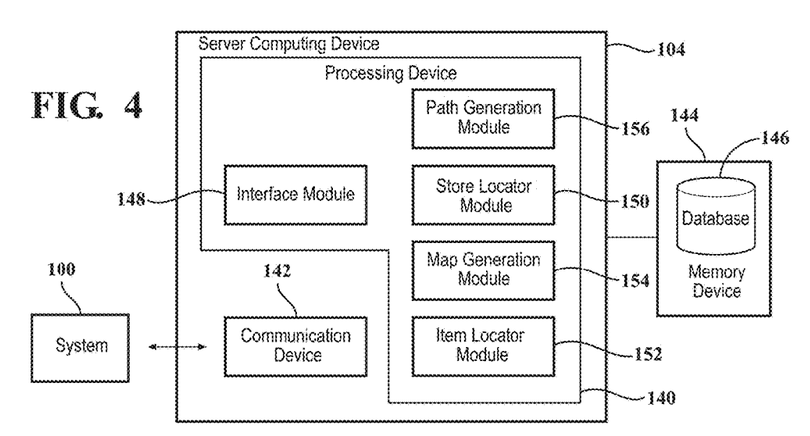
FIG. 4 is a diagrammatic view of one portion of the system of FIG. 1.

Referring to FIG. 4, the server computing device 104 may include a processing device 140, a communication device 142, and memory device 144 having one or more database 146. The processing device 140 can include memory, e.g., read only memory (ROM) and random access memory (RAM), storing processor-executable instructions and one or more processors that execute the processor-executable instructions. In embodiments where the processing device 140 includes two or more processors, the processors can operate in a parallel or distributed manner. In the illustrative embodiment, the processing device 140 executes one or more modules such as an interface module 148, a store locator module 150, an item locator module 152, a map generation module 154, and a path generation module 156.

The communication device 142 is a device that allows the server computing device 104 to communicate with another device, e.g., the user computing device 107, 118, via the network 120. The communication device 142 can include one or more wireless transceivers for performing wireless communication and/or one or more communication ports for performing wired communication. The communication device 142 is accessible to the processing device 140.

The memory device 144 is a device that stores data generated or received by the server computing device 104. The memory device 144 can include, but is not limited to a hard disc drive, an optical disc drive, and/or a flash memory drive. Further, the memory device 144 may be distributed and located at multiple locations. The memory device 144 is accessible to the processing device 140. In some embodiments, the memory device 144 stores the database 146.

The modules 148, 150, 152, 154, 156 include software and/or hardware modules implementing the methods disclosed herein. In some embodiments, the modules 148, 150, 152, 154, 156 and data of the modules 148, 150, 152, 154, 156 are implemented or accessed by the server computing device 104 or some other entity that provides an interface to the modules 148, 150, 152, 154, 156.

The database 146 may include data for items or products located in the retail store 106. Accordingly, the server computing device 104 may host or access the database 146 of items located in the retail store 106. The database 146 may store a plurality of items or product records. The item records may have one or more brands associated therewith. A brand for an item may represent the manufacturer, seller, importer, or the like for a product and/or a manufacturer of a component part of a product, or other reference to an entity participating in the production and offer for sale of an item or product.

The database 146 may include map data for a map of the retail store 106. Accordingly, the server computing device 104 may host or access the database 146 for a map of the retail store 106. The database 146 may store a plurality of maps for a plurality of retail stores 106. It should be appreciated that each map is produced from a CAD drawing of each retail store 106.

The database 146 stores maps corresponding to different retail locations of the retail stores 106. Each map can be divided into a plurality of regions. A region can describe any type of boundary in the retail location. For instance, in the supermarket setting, a region can refer to a section, e.g., deli or frozen foods, one or more aisles, e.g., aisle, a checkout station, and/or a bank of checkout stations. In some embodiments, the regions may be defined by a collection of geospatial coordinates, e.g., GPS coordinates. Additionally, each map may have metadata associated therewith. Furthermore, for each retail location, the database 146 may store item locations for the items sold at the retail location 106. In one embodiment, the item location may be an XY coordinate in the retail store 106. Each product has an aisle location which has a GPS coordinates or a relative location, e.g., "Brand X Cereal" is located at aisle nine, 50 feet from the front of the aisle. The map is a CAD drawing that is processed into a scalable vector graphic (SVG). It should be appreciated that, when the aisle location of an item is changed to a new aisle, the location inherently changes as well because the aisles are fixed to locations. It should also be appreciated that, as used herein, the term "map" may refer to a digital representation of the layout of the corresponding store location of the retail store 106.

In some embodiments, the database 146 stores item waypoints indicating physical locations of the items sold by the retailer in a particular or specific retail store 106 operated or associated with the retailer. For example, the database 146 may store the location of "milk" in the retail store 106 operated or associated with the retailer.

The database 146 may be configured to store waypoints for specific items and generic items. For example, the database 146 may be configured to store waypoints indicating the location of "ice cream," a generic item, and the location of "Brand X ice cream," a specific item. It should be noted that a waypoint corresponding to a generic item or specific item may be represented using a starting location and ending location. For example, a waypoint corresponding to "ice cream" may indicate where the ice cream section begins and where the "ice cream" section ends. Similarly, a waypoint corresponding to "Brand X ice cream" may indicate where the Brand X's ice cream begins and ends. It should be appreciated that when a specific item is a species of a generic item, e.g., Brand X ice cream is a species of "ice cream," the waypoint corresponding to a specific item may be wholly contained within the waypoint corresponding to the generic item. It should further be appreciated that one system or database links products to aisles and the other system or database links aisles to locations, which are both combined to get locations for items in the aisles.

As discussed, the processing device 144 may execute the store locator module 150. The store locator module 150 receives a location from the user computing device 107 and determines one or more store locations of the retail store 106 corresponding to the received location. In some embodiments, the store locator module 150 queries the database 146 of store locations with the received location and receives the store location of the retail store 106 that correspond to the received location.

The item locator module 152 receives an input of items to be located in the retail store 106 and determines item waypoints corresponding to one or more items or products. In some embodiments, the product locator module 152 queries the database 146 with the items and a store location (which may have been determined by the store locator module 150) and receives item waypoints indicating a location of the items indicated in the retail store 106 corresponding to the store location.

Once the item locator module 152 has determined the various waypoints, e.g., item waypoints, the item locator module 152 may provide the item waypoints to the user computing device 107, such that the user computing device 107 can display the item waypoints. It should be appreciated that the user computing device 107 can display the item waypoints in an electronic store map for the retail store 106.

The map generation module 154 can generate maps for each map stored in the database 146 or can generate a map upon receiving a request for a map for a particular location of the retail store 106 from a requesting device, e.g., a user computing device 107. For purposes of explanation, the description of the map generation module 154 assumes that the maps are generated in response to a request for a map for a particular location of the retail store 106. It should be appreciated that the techniques described herein can be modified to generate maps for all of the retail locations in the database 146 at defined intervals, e.g., every 15 minutes.

The map generation module 154 can receive a request to generate a map for a particular retail location. In response to the request, the map generation module 154 retrieves a map corresponding to the particular retail location from the database 146. Furthermore, the map generation module 154 can receive inputs for each region of the retail location from the system 100. For example, the map generation module 154 can receive inputs indicating (L, R, P) from the system 100, where L is the retail store location, R is a region of the retail location, and P is a product in the region R. The map generation module 154 receives these inputs for each of the regions in the particular retail location. It should be appreciated that the map generation module 154 only knows the aisle locations for the items and nothing about the items themselves.

In some embodiments, the map generation module 154 may be further configured to obtain a map corresponding to the location of the retail store 106. The map generation module 154 can obtain the map from the database 146. In some of these embodiments, the map generation module 154 can provide the map and the item waypoints to the user computing device 107. In other embodiments, the map generation module 154 can render the map with one or more waypoints displayed therein. In these embodiments, the map generation module 154 may use the locations indicated by the various waypoints to determine locations in the map where the graphical icons should be displayed. The map generation module 154 can then insert the graphical icons at the determined locations. The map generation module 154 can provide the rendered image to the user computing device 107.

The path generation module 156 determines an optimized pick path or route to pick the items in the batched orders of the different commodities. The path determination module 156 generates an optimized pick path through the retail store 106 to pick the one or more items according to an optimization algorithm that generates the optimized pick path based on item location of the one or more items within the batched orders of the different commodities. In some embodiments, the path generation module 156 is configured to optimize the route or pick path to minimize the amount of distance traveled and/or the amount of time spent traveling through the retail store 106 to pick the items.

The system 100 links the server computing device 104 to transmit and provide a physical location of the items in the retail store 106. The store map is overlaid with icons or waypoints and optimized pick path on the display 138 of the user computing device 107. The store map represents the retail store 106 and the waypoints for the items and navigation path are positioned overlaid on the store map to designate a physical location of the items in the retail store 106. It should be appreciated that the store map is a full-screen map and the items are displayed along the path or in an item/product information section on the store map such that a waypoint and pick path for each item will appear on the store map.

Figure 5:
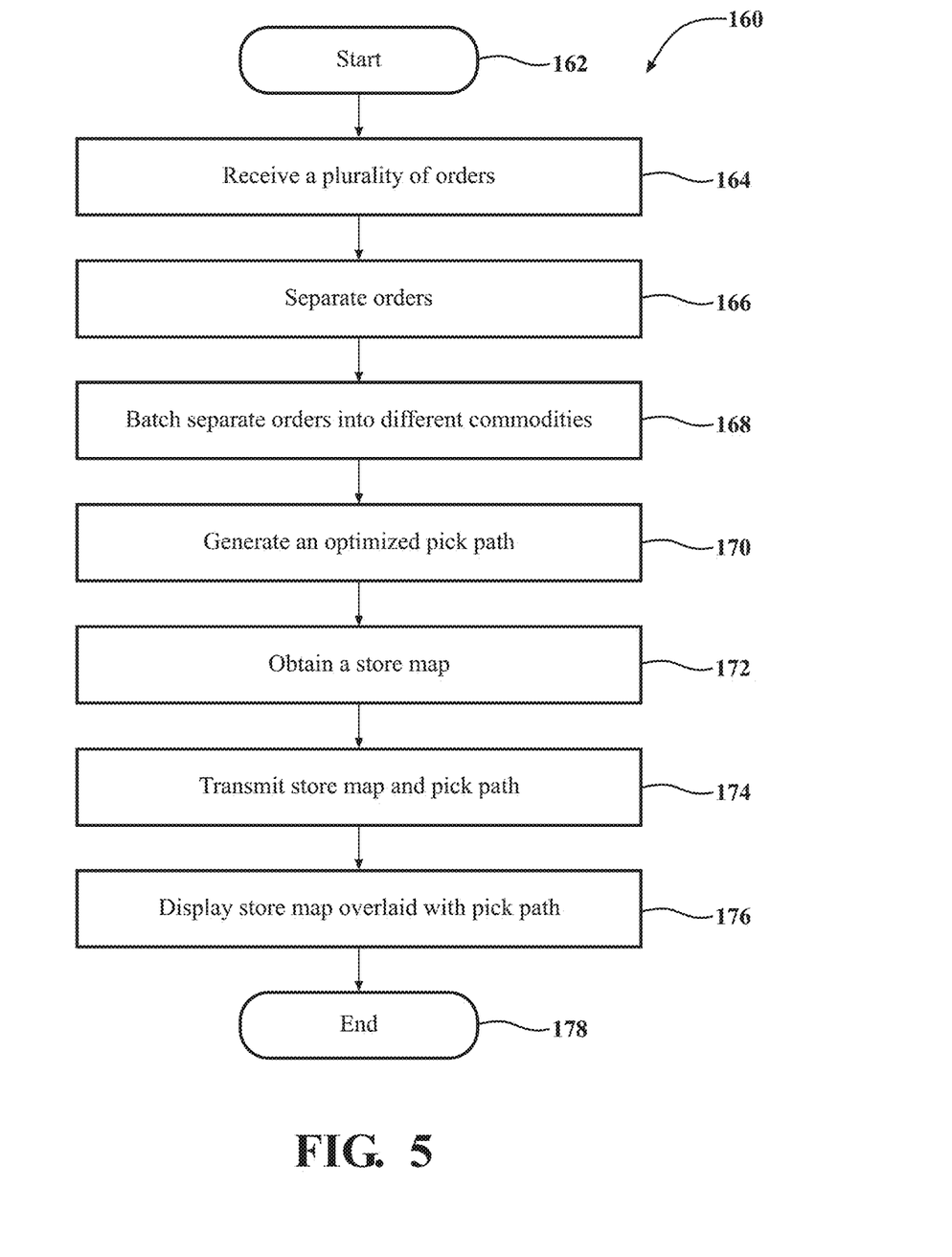
FIG. 5 is a flowchart of a method, according to one embodiment of the present invention, of using the system of FIGS. 1 through 4.

Referring to FIG. 5, a method, according to the present invention, for improving order batching using location information of items in the retail store 106 is disclosed. The method uses Item-Item XY distance data to improve order batching for picking items in the retail store 106. An example method 160, according to one embodiment of the present invention, using the system 100 is illustrated. The method 160 can be executed by the components illustrated in FIGS. 1 through 4. In general, a flowchart of the method 160, according to one embodiment of the present invention, starts in bubble 162. The method 160 includes the steps of receiving a plurality of orders from customers 112 in block 164. For example, receiving, by the server computing device 104 or the system 100, a plurality of orders to be fulfilled in the retail store 106. The method 160 also includes the step of separating the orders received in block 166. For example, separating, by the computing device 104 or system 100, the orders by load number and due times. The method 160 includes the steps of batching separate orders into different commodities in block 168. For example, batching, by the computing device 104 or the system 100, the separate orders into different commodities. The method includes the steps of generating an optimized pick path in block 170. For example, generating, by the computing device 104 or the system 100, an optimized pick path through the retail store 106 to pick the one or more items according to an optimization algorithm that generates the optimized pick path based on item location of the one or more items within the batched orders of the different commodities. The method 160 includes the steps of obtaining a store map with locations for the items within the retail store 106 in block 172. For example, obtaining, by the server computing device 104 or system 100, a store map of the retail store 106, the store map being indicative of a layout of the retail store 106 and the one or more items. The method 160 may include the steps of identifying the items with aisle locations that match map data or XY coordinates. For example, identifying, by the server computing device 104 or system 100, the items with aisle and/or bay locations that match map data for the store map. The method 160 includes the steps of transmitting the store map and pick path in block 174. For example, transmitting, by the server computing device 104 or system 100, a representation of the store map and the optimized pick path to the user computing device 107. The method 160 further includes displaying the store map overlaid with the optimized pick path on a graphical display of the user computing device 107 in block 176. For example, displaying, by the server computing device 104 or system 100, the store map overlaid with the optimized pick path on the graphical display 138 of the user computing device 107, each of the items being associated with a physical location of the item in the retail store 106, wherein the store map represents the retail store 106 and the waypoint and optimized pick path is positioned overlaid on the map to designate a physical location of a corresponding one of the one or more items. The method ends in block 178. It should be appreciated that the method includes other steps such as providing the computer system and servers and coupling the servers to one another.

Figure 6:
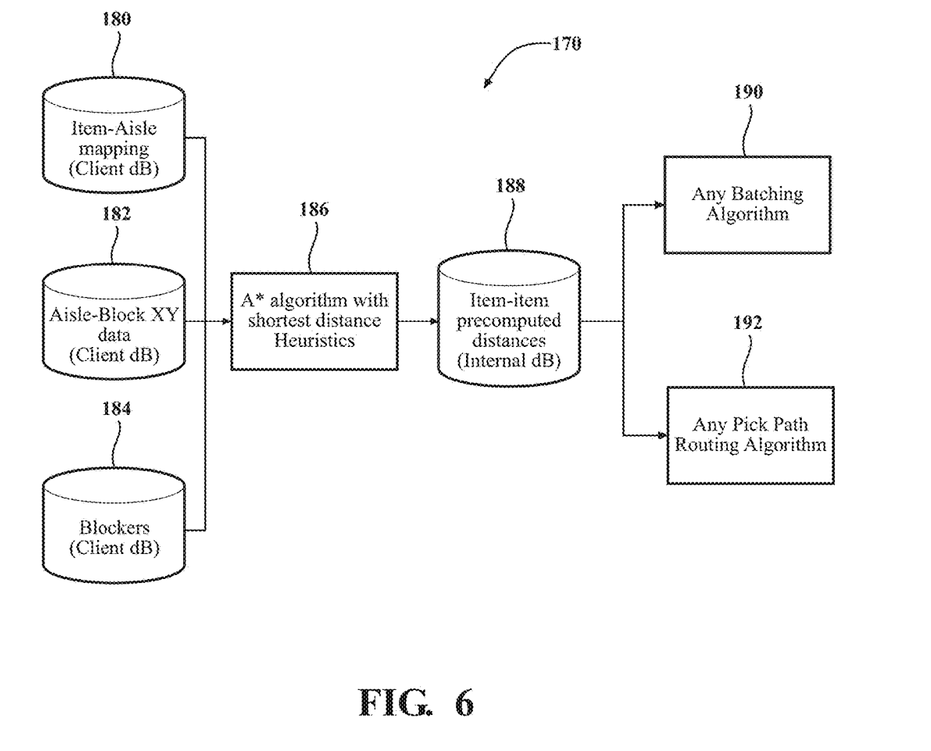
FIG. 6 is a diagrammatic view of a portion of the flowchart of FIG. 5.

Referring to FIG. 6, a diagrammatic view of block 170 is shown. In block 170, an optimized pick path through the retail store 106 to pick the one or more items according to an optimization algorithm is generated based on item location of the one or more items within the batched orders of different commodities. When multiple order are batched and picked together, time is saved to traverse overlapping paths. So, saving between order i & order j is defined as:

$$sav_{ij} = d_i + d_j - d_{ij}$$

$d_i$=distance travelled to pick all items in order i
$d_j$=distance travelled to pick all items in order j
$d_{ij}$=distance travelled to pick all items in order j and order i as well.

The optimization algorithm starts in block 180 with Item-Aisle mapping by finding the four (4) corner points of the retail store 106 and dividing the two dimensional array of the retail store 106 (array with 1s and 0s) into small grids with some configurable width and height. The optimization algorithm, for each aisle (cluster of modules), based on their bay types and aisle types, marks them as obstacles (1) in the 2-dimensional array and the rest is free space (0) as Aisle-Block XY data in block 182 and Blockers in block 184. The optimization algorithm includes iterating through all picks points (mid point of width of bay), which are before each bay. The optimization algorithm includes running an algorithm with shortest path or distance heuristics by giving the source and destination pick points in block 186. The optimization algorithm produces item-item precomputed distances in block 188. The optimization algorithm uses any known batching algorithm in block 190 or any pick path routing algorithm in block 192 to generate the optimized pick path.

The optimization algorithm is used to calculate $d_i$ using XY data as follows:
Algorithm 1 Picking Optimizer
 1: procedure GETBESTPATH(XYdata, itemList);
 2: randomSolutionList=generateRandomSolutions(itemList, XYdata),
 3: topSolutions=getTopSolutions(randomSolutionList);
 4: while not converged or finite steps do;
 5: solutionList=getNextGeneration(XYdata, topSolutions); and
 6: topSolutions=getTopSolutions(solutionList).

The method randomly generates valid complete pick path solutions and getNextGeneration.

Figure 7:
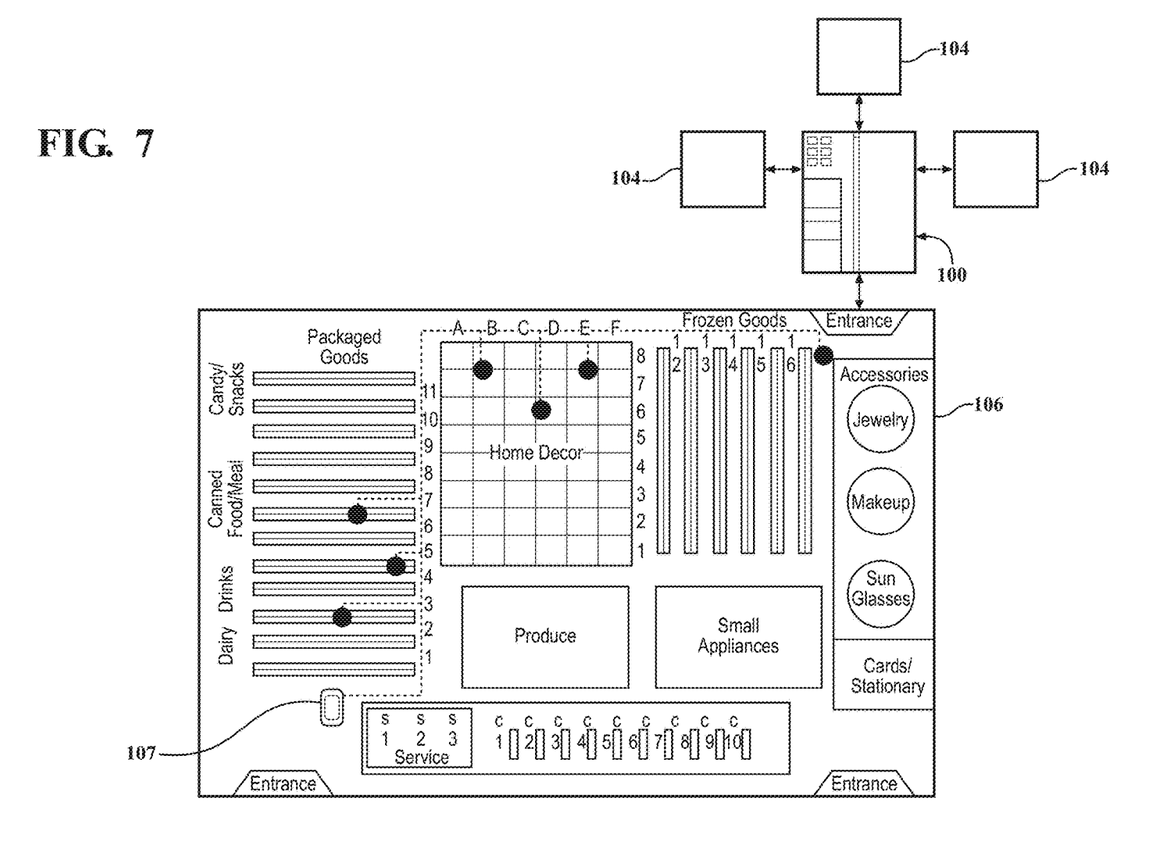
FIG. 7 is a diagrammatic view of an exemplary optimized pick path within the retail store of FIG. 1.

Referring to FIG. 7, an exemplary optimized pick path for the retail store 106 is shown. As illustrated, the optimized pick path may be generated for the picker showing the path in dotted lines from the user computing device 107 of the picker to the item waypoints. The path generation module 156 can display the store map to the picker via the display 138 (FIG. 3). In the illustrated example, the item waypoints are displayed as graphical icons, e.g., black circles. For example, the store map may include a first product waypoint (e.g., location of "milk") and a second product waypoint (e.g., location of "cheese") in the dairy section. It should be appreciated that the system 100 is configured to define an optimized pick path from one of a current location of the picker to the items to be picked.

Figure 8:
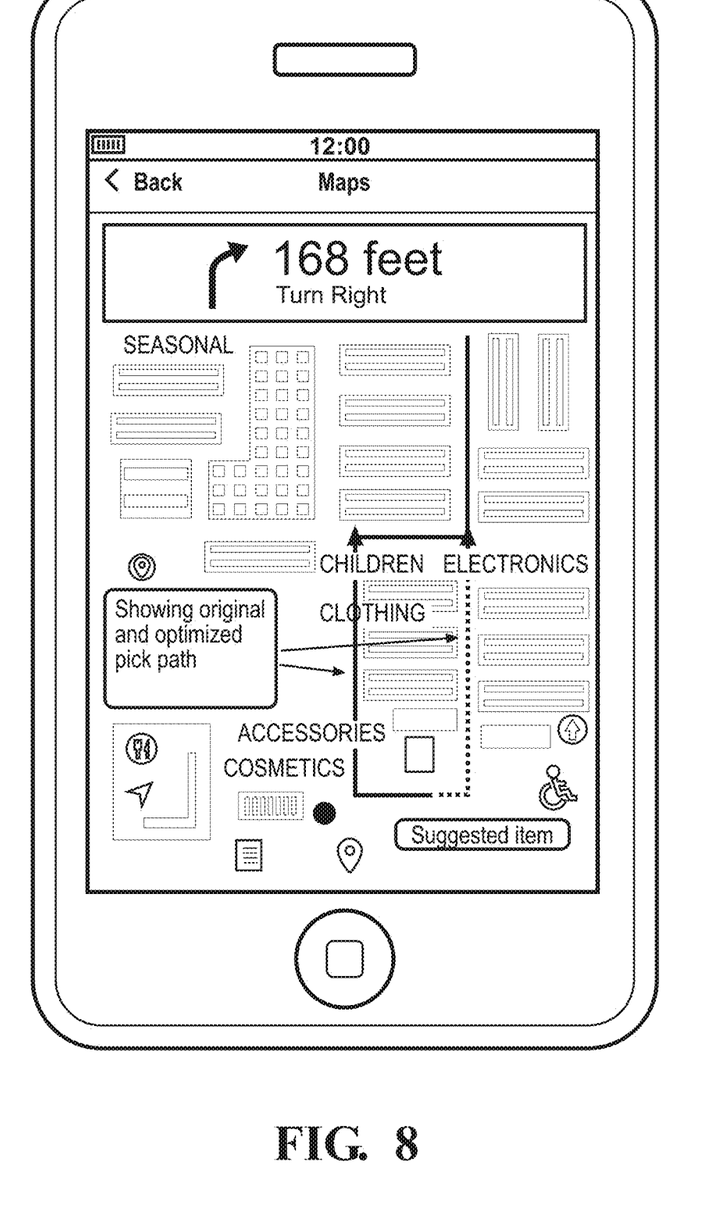
FIG. 8 is an illustration of an exemplary screenshot of the user device of FIG. 3 used with the system of FIG. 1.

Referring to FIG. 8, the user computing device 107 can display a map and a pick path for the retail store 106 on the display 138 of the user computing device 107 to the picker. On the display 138, the map for the retail store 106 is displayed. Each of the items to be picked includes a waypoint, which appears on the map on the display 138 for the retail store 106. The store map displays a pick path for the user computing device 107 to the item waypoints. As can be appreciated, the item waypoints can identify a specific aisle if the item indicated by the item is in an aisle. Otherwise, a description of the section of the item, e.g., "Produce" or "Can Goods," can be used to show the location of the item. It should be appreciated that the example of FIG. 8 is provided for example only and not intended to be limiting.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
a computing device configured to provide output to a user device;
the computing device being configured to receive a plurality of orders having one or more items, to:
separate orders of the plurality of orders by load number and due times,
find item-item XY distances for each of the one or more items in relation to corner points of a retail store,
batch the orders, as separated, into different commodities,
generate, using the item-item XY distances, an optimized pick path through the retail store to pick the one or more items according to an optimization algorithm that generates the optimized pick path based on item location of the one or more items within the orders, as separated and subsequently batched, of the different commodities,
obtain a store map, the store map being indicative of a layout of the retail store, and
transmit a representation of the store map and the optimized pick path to the user device, and to display the store map overlaid with the optimized pick path on a graphical display of the user device.

2. A system, as set forth in claims 1, wherein the computing device is further configured to find the optimization algorithm produces item-item XY pre-computed distances for each of the one or more items by finding four (4) corner points of the retail store.

3. A system, as set forth in claim 2, wherein the computing device is further configured to divide a two dimensional representation of the retail store into small grids with configurable width and height.

4. A system, as set forth in claim 3, wherein the computing device is further configured to:
mark each aisle of the retail store based on a bay type and an aisle type as obstacles in the two dimensional representation; and
designate a remaining portion of the two dimensional representation as free space.

5. A system, as set forth in claim 4, wherein the computing device is further configured to iterate through all picks points, which are before each bay.

6. A system, as set forth in claim 5, wherein the computing device is further configured to run the optimization algorithm with shortest path or distance heuristics by giving source and destination pick points.

7. A system as set forth in claim 1, wherein said the computing device is further configured to generate an icon being associated with a physical location of each of the one or more items in the retail store, and to present to the icon, wherein the store map represents the retail store and the icon and the optimized pick path are positioned overlaid on the store map to designate the physical location of each of the one or more items in the retail store.

8. A system, as set forth in claim 7, wherein the system includes an item location database that stores a plurality of waypoints corresponding to the retail store, each waypoint of the plurality of waypoints is a respective icon indicating a respective item in the retail store.

9. A system, as set forth in claim 1, where said the computing device includes a map generation module to generate a map showing a physical location of the one or more items on the map.

10. A system, as set forth in claim 1, wherein the computing device includes a path generation module monitoring a current location of a user, acquiring an in-store location for the one or more items, and providing the optimized pick path from the current location to the in-store location, the optimized pick path being configured for display to the user on the user device.

11. A method comprising:
receiving, by a computing device, a plurality of orders having one or more items;
separating, by the computing device, orders of the plurality of orders by load number and due times;
finding, by the computing device, item-item XY distances for each of the one or more items in relation to corner points of a retail store;
batching, by the computing device, the orders into different commodities;
generating, by the computing device, using the item-item XY distances, an optimized pick path through the retail store to pick the one or more items according to an optimization algorithm that generates the optimized pick path based on item location of the one or more items within the orders, as separated and subsequently batched, of the different commodities;
obtaining, by the computing device, a store map, the store map being indicative of a layout of the retail store;
transmitting, by the computing device, a representation of the store map and the optimized pick path to a user device; and
displaying the store map overlaid with the optimized pick path on a graphical display of the user device.

12. A method, as set forth in claim 11, wherein including a step of finding, by the computing device, the optimization algorithm produces the item-item XY distances for each of the one or more items by finding four (4) corner points of the retail store.

13. A method, as set forth in claim 11, including a step of dividing, by the computing device, a two dimensional representation of the retail store into small grids with configurable width and height.

14. A method, as set forth in claim 13, including a step of marking, by the computing device, each aisle of the retail store based on a bay type and an aisle type as obstacles in the two dimensional representation and designate a remaining portion of the two dimensional representation as free space.

15. A method, as set forth in claim 14, including the steps of iterating, by the computing device, through all picks points, which are before each bay.

16. A method, as set forth in claim 15, including a step of running, by the computing device, the optimization algorithm with shortest path or distance heuristics by giving source and destination pick points.

17. A method, as set forth in claim 11, including steps of monitoring a current location of a user, acquiring an in-store location for the one or more items, and providing the optimized pick path from the current location to the in-store location, the optimized pick path being configured for display to the user on the user device.

18. A method, as set forth in claim 11, including a step of rendering an image of the store map having an item waypoint and the optimized pick path displayed therein, wherein the image, including the optimized pick path, is provided to the user device for display.

19. A method, as set forth in claim 11, including a step of generating a map showing a physical location of one or more items in the retail store.

20. One or more non-transitory computer-readable storage media, having computer-executable instructions embodied thereon, wherein when executed by at least one processor, the computer-executable instructions cause the processor to:

receive a plurality of orders having one or more items;

separate orders of the plurality of orders by load number and due times;

batch the orders into different commodities;

find item-item XY distances for each of the one or more items in relation to corner points of a retail store;

generate, using the item-item XY distances, an optimized pick path through the retail store to pick the one or more items according to an optimization algorithm that generates the optimized pick path based on item location of the one or more items within the orders, as separated and subsequently batched, of the different commodities;

obtain a store map, the store map being indicative of a layout of the retail store;

transmit a representation of the store map and the optimized pick path to a user device; and     display the store map overlaid with the optimized pick path on a graphical display of the user device.

\* \* \* \* \*